(12) United States Patent
Hussain et al.

(10) Patent No.: US 9,313,188 B2
(45) Date of Patent: Apr. 12, 2016

(54) PROVIDING DOMAIN-JOINED REMOTE APPLICATIONS IN A CLOUD ENVIRONMENT

(71) Applicant: MICROSOFT TECHNOLOGY LICENSING, LLC, Redmond, WA (US)

(72) Inventors: Amjad Hussain, Kirkland, WA (US); Jonathan Austin Hoover, Kirkland, WA (US); Tristan William Scott, Issaquah, WA (US); Ido Miles Ben-Shachar, Kirkland, WA (US); Kevin Scott London, Gulf Breeze, FL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 13/917,890

(22) Filed: Jun. 14, 2013

(65) Prior Publication Data

US 2014/0373092 A1 Dec. 18, 2014

(51) Int. Cl.
*G06F 17/00* (2006.01)
*H04L 29/06* (2006.01)
(Continued)

(52) U.S. Cl.
CPC .............. *H04L 63/08* (2013.01); *G06F 9/5072* (2013.01); *G06F 9/5077* (2013.01);
(Continued)

(58) Field of Classification Search
CPC ....... G06F 9/455; G06F 9/45533; G06F 9/50; G06F 9/5077; G06F 2009/45562; G06F 2009/45566; G06F 2009/4557; G06F 2009/45575; G06F 2009/45587; G06F 21/445; H04L 9/32; H04L 9/321; H04L 63/02; H04L 63/0272

USPC .................................................. 726/3; 718/1
See application file for complete search history.

(56) References Cited

U.S. PATENT DOCUMENTS 7,475,125 B2    1/2009   Brockway et al.
8,332,847 B1 *  12/2012  Hyser ................. G06F 9/45558
                                                          718/1

(Continued)

OTHER PUBLICATIONS

"CloudSim: a toolkit for modeling and simulation of cloud computing environments and evaluation of resource provisioning algorithms", Rodrigo N. Calheiros et al., Published in ACM Journal—Software Practice & Experience archive, vol. 41 Issue 1, Jan. 2011, pp. 23-50.*

(Continued)

*Primary Examiner* — Jayesh Jhaveri
(74) *Attorney, Agent, or Firm* — Kate Drakos; Sade Fashokun; Micky Minhas

(57) ABSTRACT

Embodiments are directed to provisioning private virtual machines in a public cloud and to managing private virtual machines hosted on a public cloud. In one scenario, a computer system receives authentication information for a private domain from an entity. The entity indicates that their private virtual machines are to be provisioned on a public cloud, where the entity's private domain is accessible using the authentication information. The computer system establishes a virtual network on the public cloud which is configured to host the entity's private virtual machines, where each virtual machine hosts remote applications. The computer system establishes an authenticated connection from the virtual network to the entity's private domain using the received authentication information and provides the entity's private virtual machines on the public cloud. The remote applications provided by the private virtual machines then have access to data stored within the entity's private domain using the authenticated connection.

21 Claims, 4 Drawing Sheets

(51) Int. Cl.
*G06F 9/455* (2006.01)
*G06F 9/50* (2006.01)
*H04L 9/32* (2006.01)
*G06F 21/44* (2013.01)

(52) U.S. Cl.
CPC .......... *H04L 63/0272* (2013.01); *G06F 9/455* (2013.01); *G06F 9/45533* (2013.01); *G06F 9/50* (2013.01); *G06F 21/445* (2013.01); *G06F 2009/4557* (2013.01); *G06F 2009/45562* (2013.01); *G06F 2009/45566* (2013.01); *G06F 2009/45575* (2013.01); *G06F 2009/45587* (2013.01); *H04L 9/32* (2013.01); *H04L 9/321* (2013.01); *H04L 63/02* (2013.01)

(56) References Cited

U.S. PATENT DOCUMENTS

| | | | |
|---|---|---|---|
| 9,189,265 B2* | 11/2015 | Hiltgen | G06F 9/45558 |
| 2007/0130566 A1* | 6/2007 | van Rietschote et al. | 718/1 |
| 2007/0180493 A1* | 8/2007 | Croft et al. | 726/2 |
| 2007/0300220 A1* | 12/2007 | Seliger | G06F 8/61 718/1 |
| 2011/0209064 A1 | 8/2011 | Jorgensen et al. | |
| 2011/0231840 A1* | 9/2011 | Burch et al. | 718/1 |
| 2012/0066487 A1* | 3/2012 | Brown et al. | 713/150 |
| 2012/0233668 A1 | 9/2012 | Leafe et al. | |
| 2012/0233678 A1* | 9/2012 | Pal | G06F 21/445 726/7 |
| 2012/0266231 A1* | 10/2012 | Spiers et al. | 726/12 |
| 2012/0324112 A1* | 12/2012 | Dow et al. | 709/226 |
| 2013/0054426 A1 | 2/2013 | Rowland et al. | |
| 2013/0074064 A1 | 3/2013 | Das et al. | |
| 2013/0097296 A1 | 4/2013 | Gehrmann et al. | |
| 2013/0283263 A1* | 10/2013 | Elemary | G06F 9/45558 718/1 |
| 2014/0058871 A1* | 2/2014 | Marr et al. | 705/26.1 |
| 2014/0082612 A1* | 3/2014 | Breitgand et al. | 718/1 |
| 2014/0109087 A1* | 4/2014 | Jujare et al. | 718/1 |
| 2014/0164624 A1* | 6/2014 | Ames | G06F 9/45558 709/226 |

OTHER PUBLICATIONS

Jian Lin, et al., VegaWarden: A Uniform User Management System for Cloud Applications, Networking, Architecture and Storage (NAS), 2010 IEEE Fifth International Conference on, IEEE, Piscataway, NJ, USA, Jul. 15, 2010, pp. 457-464.

"International Search Report & Written Opinion for PCT Application No. PCT/US2014/041621", Mailed Date: Sep. 24, 2014, Filed Date: Jun. 10, 2014, 11 pages.

Fritz, Shannon, "Getting Started with Site-to-Azure VPN Setup", Published on Apr. 17, 2013, Available at: http://blog.concurrency.com/infrastructure/getting-started-with-site-to-azure-vpn-setup/ .

Simonsen, Morgan, "How to Connect Your on-Premise Network to Windows Azure using Windows Server as a VPN Gateway", Published on: Oct. 24, 2012, Available at: http://morgansimonsen.wordpress.com/2012/10/24/how-to-connect-your-on-premise-network-to-windows-azure-using-windows-server-as-a-vpn-gateway-2/.

"Hosted Remote Access", Published on: Apr. 1, 2010, Available at: http://masergy.com/solutions/hosted-services/hosted-remote-access.

Smith, Colin, "VDI vs. Terminal Services", Published on: Jan. 25, 2010, Available at: http://sunbehindtheclouds.wordpress.com/tag/vdi/.

"WP3—Network Virtualisation (VNet)", Published on: Apr. 26, 2013, Available at: http://www.4ward-project.eu/index.php?id=31.

"International Preliminary Report on Patentability Issued in PCT Application No. PCT/US2014/041621", Mailed Date: Jul. 7, 2015, 7 pages.

* cited by examiner

PROVIDING DOMAIN-JOINED REMOTE APPLICATIONS IN A CLOUD ENVIRONMENT

BACKGROUND

Cloud computing has become increasingly popular for a variety of reasons. For instance, cloud computing allows applications and their associated data to be processed and stored on remote cloud servers. These cloud servers could be physically located anywhere in the world. Typically, these cloud-based applications provide data to users once the user has authenticated to the cloud network. These cloud servers, however, are public-facing, and as such, some application providers may be reluctant to provide applications that require access to sensitive data.

BRIEF SUMMARY

Embodiments described herein are directed to provisioning private virtual machines in a public cloud and to managing private virtual machines hosted on a public cloud. In one embodiment, a computer system receives authentication information for a private domain from an entity such as a business. The entity indicates that one or more of their private virtual machines are to be provisioned on a public cloud, where the entity's private domain is accessible using the authentication information. The computer system establishes a virtual network on the public cloud which is configured to host the entity's private virtual machines, where each virtual machine is configured to host remote applications. The computer system then establishes an authenticated connection from the virtual network to the entity's private domain using the received authentication information and provides the entity's private virtual machines on the public cloud. At least one of the remote applications provided by the private virtual machines has access to data stored within the entity's private domain using the authenticated connection.

In some cases, the computer system further receives an indication that a management action is to be taken with respect to the entity's private virtual machines and automatically performs the indicated management action on the private virtual machines of the entity without input from the entity. Any newly created private virtual machines are connected to the entity's private domain using the authenticated connection.

In another embodiment, a computer system determines that a virtual network has been established on a public cloud. The virtual network is configured to host private virtual machines belonging to an entity (such as a business), where each virtual machine is configured to host remote applications. The computer system determines that an authenticated connection has been established from the virtual network to a private domain belonging to the entity using authentication information received from the entity. The computer system then receives an indication that a new virtual machine is to be created on the public cloud and automatically creates the new private virtual machine without input from the entity, the new private virtual machine being connected to the entity's private domain using the authenticated connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
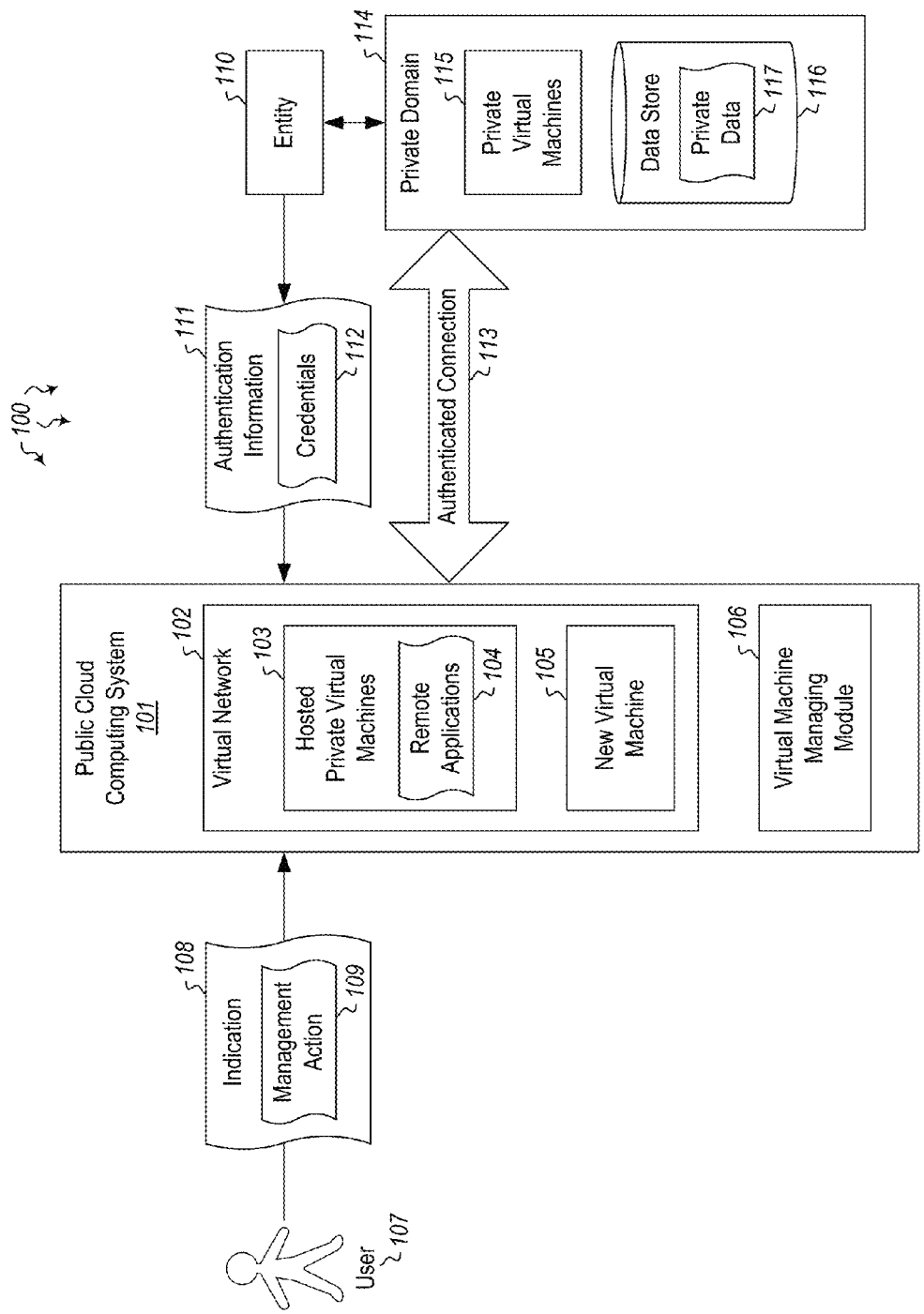
FIG. 1 illustrates a computer architecture in which embodiments described herein may operate including provisioning private virtual machines in a public cloud.

Embodiments described herein are directed to provisioning private virtual machines in a public cloud and to managing private virtual machines hosted on a public cloud. In one embodiment, a computer system receives authentication information for a private domain from an entity such as a business. The entity indicates that one or more of their private virtual machines are to be provisioned on a public cloud, where the entity's private domain is accessible using the authentication information. The computer system establishes a virtual network on the public cloud which is configured to host the entity's private virtual machines, where each virtual machine is configured to host remote applications. The computer system then establishes an authenticated connection from the virtual network to the entity's private domain using the received authentication information and provides the entity's private virtual machines on the public cloud. At least one of the remote applications provided by the private virtual machines has access to data stored within the entity's private domain using the authenticated connection.

In some cases, the computer system further receives an indication that a management action is to be taken with respect to the entity's private virtual machines and automatically performs the indicated management action on the private virtual machines of the entity without input from the entity. Any newly created private virtual machines are connected to the entity's private domain using the authenticated connection.

In another embodiment, a computer system determines that a virtual network has been established on a public cloud. The virtual network is configured to host private virtual machines belonging to an entity (such as a business), where each virtual machine is configured to host remote applications. The computer system determines that an authenticated connection has been established from the virtual network to a private domain belonging to the entity using authentication information received from the entity. The computer system then receives an indication that a new virtual machine is to be created on the public cloud and automatically creates the new private virtual machine without input from the entity, the new private virtual machine being connected to the entity's private domain using the authenticated connection.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes public cloud computing system 101. Public cloud computing system 101 may be any type single- or multi-processor distributed computer system. The processors may be distributed over substantially any geographical area, and may be connected together via a network. The computer architecture 100 also includes an entity's private domain 114. This private domain 114 may include one or more computing systems which, themselves, may be local or distributed computing systems. Both the public cloud computing system 101 and the entity's private domain 114 include modules for performing a variety of different functions. For instance, the public cloud 101 includes a virtual network 102. The virtual network 102 may be any type of network that can run on or be managed by the public cloud 101. The virtual network may include hosted private virtual machines (VMs) 103, each of which may have its own hosted remote applications 104.

In some embodiments, the virtual network may have a plurality of different virtual machines. These virtual machines may be public-facing, or may be private such that only authenticated users can access them. In some cases, the private VMs 103 hosted in the virtual network 102 allow access to resources provided by the entity 110. These resources may include data stored on databases, software applications or services, networking functionality or other types of resources. For example, the resources accessible by the remote applications 104 hosted on the private VMs 103 may include private data 117 stored in data store 116. The entity itself 110 may be a business entity, government entity, private user or other type of entity.

Embodiments described herein thus allow a customer (e.g. entity 110) to provision their existing software applications in a public cloud environment and users (e.g. 107) access resources on the customer's corporate (or other) network. Using this environment, end-users can remotely connect to the applications and data made available to them by their company or other entity. Entities can set up a virtual network 102 that hosts virtual machines, each of which allow multi-user access to remote applications 104. Entities can also use the virtual machine managing module 106 to manage and automatically provision these VMs within the virtual network 102. As such, the system allows end users (e.g. 107) to seamlessly connect to their entity-provided remote applications, especially those which require access to resources within the entity's private network 114.

System embodiments may include any one or more of the following components: a central service that manages creation of virtual networks (e.g. 102) in a customer environment. The system allows customers (e.g. entity 110) to sign up for access to the central service (provided by public cloud computing system 101) which allows the customers to create and manage virtual networks in the public cloud. (As such, virtual network 102 may be one of many different virtual networks running on public cloud 101). The virtual network 102 includes the VMs from which the remote applications 104 are run. At least in some cases, the virtual network 102 is connected to the entity's private domain 114 via an authenticated connection. The virtual network allows VMs and remote applications running inside it to communicate with the rest of the entity's network (e.g. private VMs 115 or private data 117). The virtual network 102 may also be configured to only allow access to specific external users (e.g. user 107).

Additional system components include a virtual machine managing module 106 which allows entities to automatically provision their virtual machines. In some cases, these VMs may be provisioned according to a specific list of settings that are to be applied to each VM that is provisioned. These VMs may be provisioned automatically according to policy established by the entity 110. These policies may be the same for all applications provided by that entity, or may be different for each application or type of application. The VM managing module 106 can also manage the entity's VMs after they have been instantiated. This managing may include joining the applications (e.g. 104) to the entity's corporate (or other) network (i.e. private domain 114). A connection manager may also be used to tunnel and/or load-balance incoming traffic to an appropriate virtual machine, depending on current load and need. These concepts will be explained further below with regard to methods 200 and 300 of FIGS. 2 and 3, respectively.

Figure 2:
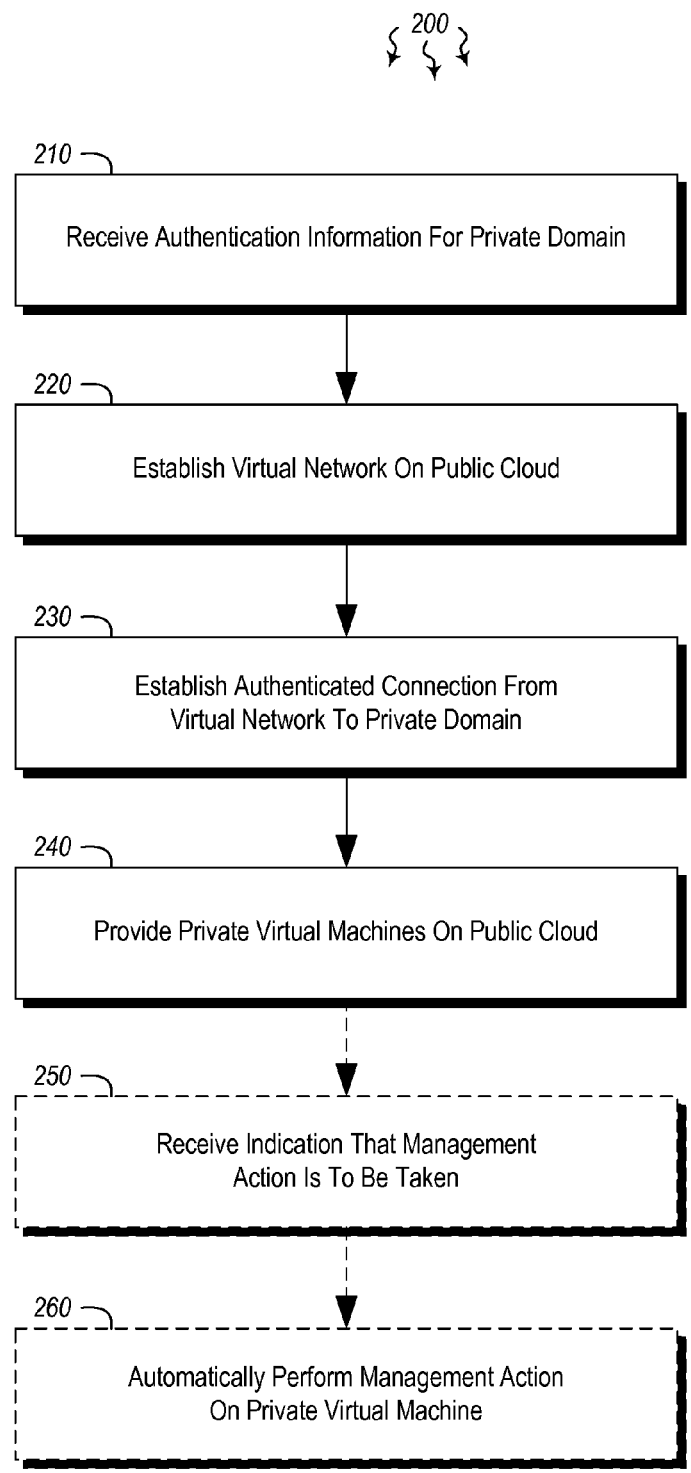
FIG. 2 illustrates a flowchart of an example method for provisioning private virtual machines in a public cloud.
Figure 3:
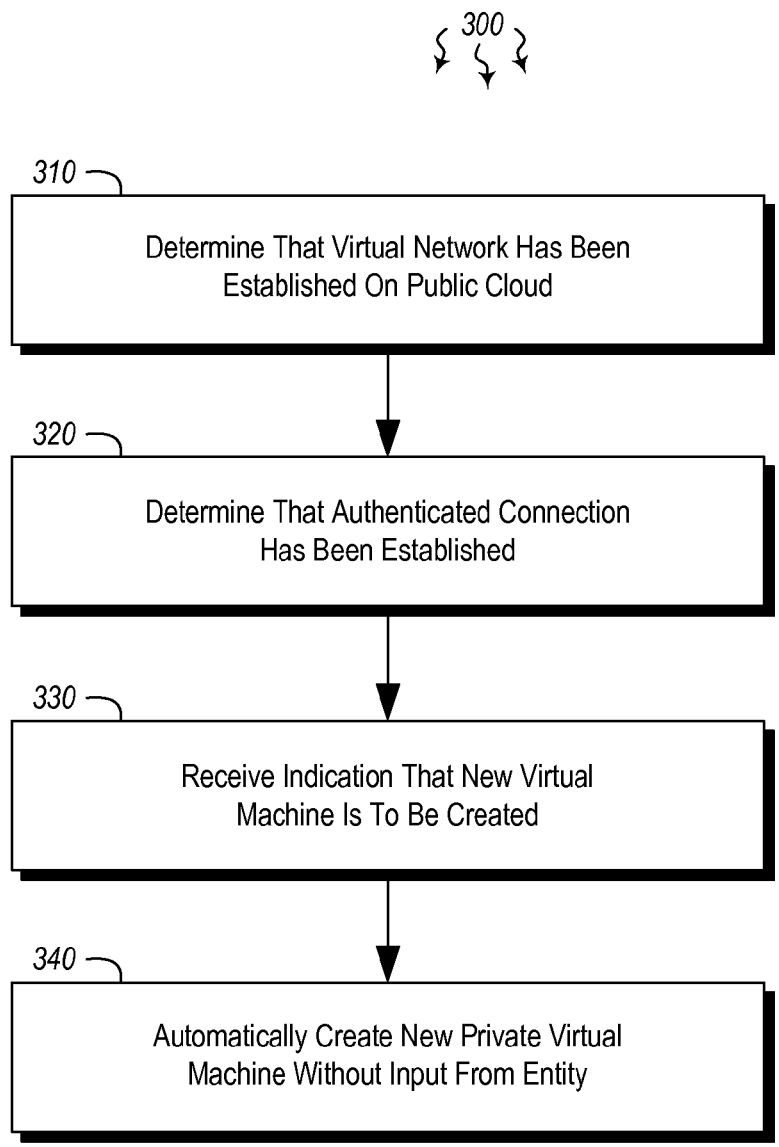
FIG. 3 illustrates a flowchart of an example method for managing private virtual machines hosted on a public cloud.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for provisioning private virtual machines in a public cloud. The method 200 will now be described with frequent reference to the components and data of environment 100.

Method 200 includes an act of receiving authentication information for a private domain from an entity, the entity indicating that one or more of their private virtual machines are to be provisioned on a public cloud, the entity's private domain being accessible using the authentication information (act 210). For example, the public cloud computing system 101 (or a service running thereon) may receive authentication information 111 from entity 110. The authentication information 111 may include one or more authentication credentials 112 including user name, password, biometric data or any other information that could be used to authenticate the entity 110 to the public cloud computing system 101. A separate indication may be sent from the entity (or the indication may be sent with the authentication information) indicating that the entity 110 has one or more private virtual machines 115 that are to be provisioned (i.e. made available to authenticated users) on the public cloud 101.

Method 200 next includes an act of establishing a virtual network on the public cloud, the virtual network being configured to host the entity's one or more private virtual machines, each virtual machine being configured to host one or more remote applications (act 220). The public cloud 101 may establish one or more virtual networks 102 which can each host one or more private VMs 103. Each of the VMs, in turn, may be configured to run one or more remote applications 104. The remote applications will have access to private data 117 owned by the entity over the authenticated connection that is established from the virtual network to the entity's private domain using the received authentication information (act 230).

As mentioned above, the entity sends authentication information 111, including credentials 112, to the public cloud 101. The public cloud (or, perhaps, an authentication service running on the public cloud) then authenticates the entity and establishes an authenticated connection 113. This connection may stay open for a specified amount of time (after which the connection will be invalid), or may be opened for an indefinite amount of time (ending, for example, at the request of the entity 110 or a public cloud administrator). The authenticated connection may facilitate the flow of encrypted (or non-encrypted) traffic between the public cloud 101 and the entity 110. The authenticated connection 113 thus allows remote applications (and or the VMs running the applications) to access certain portions of private data 117, services or other software on private domain 114. Policy may dictate which users, virtual machines and/or remote applications have access to which private data or other resources (based on administrator-assigned rights, for example).

Method 200 further includes an act of providing at least one of the entity's private virtual machines on the public cloud, wherein at least one of the remote applications provided by the private virtual machines has access to data stored within the entity's private domain using the authenticated connection (act 240). As such, private VMs 115 can be provided on the public cloud 101. These VMs host remote applications 104 that have access to private data 117 (including user 107's private data). The private data may travel over the established authenticated connection 113.

As mentioned above, a virtual machine managing service (e.g. module 106) may be instantiated to manage the provisioning of the private virtual machines within the virtual network 102. The virtual machine managing service may, for example, send a data request for the entity 110 to send their private domain authentication information 111. In response, the entity may return their authentication information 111 including their credentials 112. The private domain authentication information 111 may, in some cases, include a service account that is accessible using the authentication credentials 112. The service account may allow the entity to manage their private VMs 115 on the public cloud 101. Thus, once the entity 110 has authenticated to the public cloud and has uploaded private VMs to the virtual network 102, end users (e.g. 107) can be given external access to various entity-specified resources, including private data 117 or other items stored in private data store 116.

The virtual machines uploaded into the virtual network 102 may be configured to run a virtual desktop infrastructure (VDI) workload. The end user 107 or the entity may specify a VDI workload that is to be processed, and one or more of the hosted private VMs 103 can process the specified workload. Moreover, as mentioned above, a central service on the public cloud may be instantiated to establish the virtual network 102. The central service may also be used to load balance incoming requests to access the private domain 117. Thus, for example, if user 107 is a member of a corporation, and the corporation has many employees who are attempting to access certain resources of the private domain 114, the central service may load balance the data requests from the plurality of users, to ensure that each user receives their requested resources in a timely manner. In some cases, the load balancing may include determining which of the entity's virtual machines 115 is currently able to handle additional load, and then send incoming data requests to that virtual machine.

Method 200 further includes an optional act of receiving an indication that a management action is to be taken with respect to one or more of the entity's private virtual machines (act 250). For example, user 107 may send an indication to the public cloud 101 that includes a management action 109. The management action 109 may include one or more actions that are to be taken on one or more of the hosted private virtual machines 103. The management actions may include, but are not limited to, creating a new private virtual machine (e.g 105), deleting an existing private virtual machine, moving an existing private virtual machine to another computer system or virtual network 102 and/or updating a private virtual machine (e.g. with a new software version). In some cases, the management actions 109 may be presented to a user via a user interface (UI). The management actions presented to the user via the UI may include (only) those management actions that are available to the user (e.g. entity 110, or in some cases, end user 107), and possibly only for a specified set of the entity's virtual machines.

Method 200 also includes another optional act of automatically performing the indicated management action on the one or more private virtual machines of the entity without input from the entity, wherein any new private virtual machines are connected to the entity's private domain using the authenticated connection (act 260). Thus, if the management action 109 indicated by the user 107 was to create a new virtual machine, the new VM 105 would be created automatically, and would have access to the private data 117 of the entity's private domain 114 via the authenticated connection 113. If the management action 109 was to remove a VM from the virtual network 102, that VM would be no longer be accessible to end users. In this manner, end users (or the entity itself) can perform management actions regarding the remote applications 104 and/or the hosted private virtual machines 103 within the virtual network 102.

FIG. 3 illustrates a flowchart of a method 300 for managing private virtual machines hosted on a public cloud. The method 300 will now be described with frequent reference to the components and data of environments 100 of FIGS. 1 and 400 of FIG. 4.

Method 300 includes an act of determining that a virtual network has been established on a public cloud, the virtual network being configured to host one or more private virtual machines belonging to an entity, each virtual machine being configured to host one or more remote applications (act 310). Thus, as shown in FIG. 1, virtual network 102 may be established on public cloud 101. The virtual network 102 hosts one or more private virtual machines 103 for the entity 110. Each VM may process one or more remote applications 104. The public cloud 101 may verify that an authenticated connection 113 has been established from the virtual network to the private domain 114 belonging to the entity using authentication information 111 received from the entity (act 320).

Figure 4:
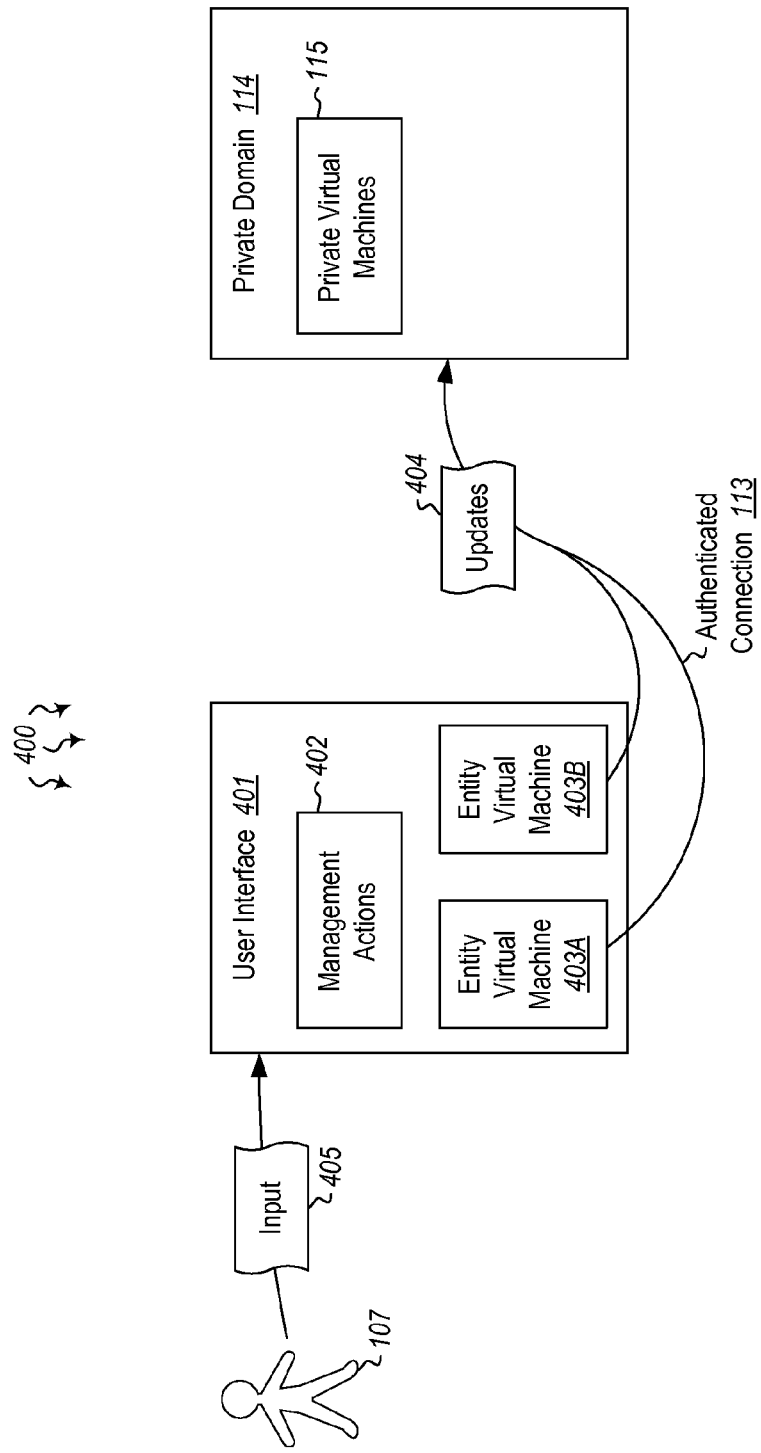
FIG. 4 illustrates a computer architecture in which private virtual machines are managed on a public cloud.

Method 300 further includes an act of receiving an indication that a new virtual machine is to be created on the public cloud (act 330). The user 107, for example, may send an indication 108 with a management action 109 that is to be taken with respect to one or more of the VMs 103 or one or more of the remote applications 104. In one embodiment, the management action may be to create a new VM (e.g. 105). The VM managing module 106 may automatically create the new private virtual machine 105 without input from the entity 110 (act 340). The new private virtual machine is automatically connected to the entity's private domain using the authenticated connection. In some cases, as shown in FIG. 4, the management actions may be presented to the user 107 via a user interface 401. The user interface may present those management actions 402 that are available for that user, for a specific set of applications.

For instance, the user 107 may indicate that at least one existing private virtual machine 103 is to be removed from the public cloud 101. The virtual machine managing module 106 may then automatically removing the private virtual machine from the public cloud 101. In some cases, a private VM may be removed automatically in response to an indication of decreased processing load. Similarly, a new private VM may be created in response to an indication of increased load. In this manner, VMs may be automatically instantiated or removed in line with demand.

In another scenario, the user may indicate that at least one existing private virtual machine 103 is to be updated to a newer version. The updates may be applied automatically to the entity's VMs 403A and 403B, after which the changes made (e.g. updates 404) may be relayed to the private VMs 115 of the private domain 114. These updates may be relayed via the authenticated connection 113. Still further, an existing service such as the VM managing module 106 or another service may be instantiated to tunnel incoming requests to the entity's private domain 114 using the authenticated connection 113. One such request may be moving an existing private virtual machine from a first private virtual machine to a second, different private virtual machine. The first private VM may then be moved, and any changes will be automatically sent to the entity's private domain. In this manner, a user may manage and make changes to VMs running in the virtual network 102 of the public cloud 101.

Accordingly, methods, systems and computer program products are provided which provision private virtual machines in a public cloud. Moreover, methods, systems and computer program products are provided which allow users to manage private virtual machines hosted on a public cloud.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising:
   one or more hardware storage media having stored thereon computer-executable instructions;
   one or more hardware processors which, when executing the computer-executable instructions, cause a system architecture to be configured for provisioning private virtual machines in a public cloud in manner to permit domain-joined remote applications, and wherein the configured system architecture comprises one or more hardware logic components configured to perform the following:
      at a public cloud computing system receiving from a private domain of an entity authentication information indicating one or more private virtual machines at the private domain which are to be provisioned on the public cloud computing system;
      establishing a virtual network at the public cloud computing system, the virtual network being configured to host the one or more private virtual machines of the entity and which are not publically accessible, each virtual machine being configured to host one or more remote applications; using the authentication information, establishing an authenticated connection between the virtual network and the private domain of the entity;
      provisioning, at a virtual machine managing module at the public cloud computing system, one or more of the private virtual machines of the private domain, at least some of the provisioned private virtual machines hosting one or more remote applications and the one or more remote applications requiring access to private data stored at the private domain that is publically inaccessible; and
      one or more users accessing at the public cloud computing system the one or more provisioned private virtual machines and then accessing through the authenticated connection the private domain for the private data required by the one or more remote applications hosted by the at least some of the provisioned private virtual machines.

2. The computer system of claim 1, wherein the one or more hardware logic components are further configured to perform the following:
   receiving from a user an indication that a management action is to be taken with respect to the one or more provisioned private virtual machines; and
   the virtual machine managing module automatically performing the indicated management action to be taken with respect to the one or more provisioned private virtual machines without input from the entity.

3. The computer system of claim 2, wherein:
   the management action comprises instantiating a new private virtual machine; and
   connecting the new virtual machine to the private domain of the entity using the authenticated connection.

4. The computer system of claim 1, wherein the virtual machine managing module sends a data request for the authentication information, and wherein the authentication information comprises a service account that is accessible using one or more authentication credentials.

5. The computer system of claim 1, wherein the virtual network is configured to allow external access to one or more specified resources.

6. The computer system of claim 1, wherein at least one of the one or more provisioned private virtual machines is configured to run a virtual desktop infrastructure (VDI) workload.

7. The computer system of claim 1, wherein a central service is instantiated to establish the virtual network on the public cloud computing system.

8. The computer system of claim 7, wherein the central service load balances incoming requests to access the private domain.

9. The computer system of claim 8, wherein the load balancing comprises determining one or more of the virtual machines at the private domain currently able to handle additional load, and sending the incoming requests to the one or more virtual machines at the private domain determined to be able to handle additional load.

10. The computer system of claim 3, wherein the new private virtual machine is created in response to an indication of increased load.

11. The computer system of claim 2, wherein:
the management action comprises receiving an indication that at least one of the one or more provisioned private virtual machines is to be removed from the virtual network at the public cloud computing system; and
automatically removing the at least one of the one or more provisioned private virtual machines from the virtual network at the public cloud computing system.

12. The computer system of claim 11, wherein the removed private virtual machine is removed automatically in response to an indication of decreased load.

13. The computer system of claim 2, wherein:
the management action comprises receiving an indication that at least one of the one or more provisioned private virtual machines is to be updated to a newer version; and
automatically updating the at least one of the one or more provisioned private virtual machines to the newer version.

14. The computer system of claim 2, wherein:
the management action comprises receiving a request to move one of the one or more provisioned private virtual machines to a different private virtual machine at the private domain of the entity; and
moving the one or more provisioned private virtual machines to the different private virtual machine at the private domain of the entity.

15. A computer-implemented method for provisioning private virtual machines in a public cloud in manner to permit domain-joined remote applications, the computer-implemented method being performed by one or more hardware processors which, when executing computer-executable instructions, cause the one or more hardware processors to perform the computer-implemented method, which comprises:
at a public cloud computing system receiving from a private domain of an entity authentication information indicating one or more private virtual machines at the private domain which are to be provisioned on the public cloud computing system;
establishing a virtual network at the public cloud computing system, the virtual network being configured to host the one or more private virtual machines of the entity and which are not publically accessible, each virtual machine being configured to host one or more remote applications;
using the authentication information, establishing an authenticated connection between the virtual network and the private domain of the entity;
provisioning, at a virtual machine managing module at the public cloud computing system, one or more of the private virtual machines of the private domain, at least some of the provisioned private virtual machines hosting one or more remote applications and the one or more remote applications requiring access to private data stored at the private domain that is publically inaccessible; and
one or more users accessing at the public cloud computing system the one or more provisioned private virtual machines and then accessing through the authenticated connection the private data required by the one or more remote applications hosted by the at least some of the provisioned private virtual machines.

16. The computer-implemented method of claim 15, further comprising:
receiving from one of the one or more users an indication that a management action is to be taken with respect to the one or more provisioned private virtual machines; and
the virtual machine managing module automatically performing the indicated management action to be taken with respect to the one or more provisioned private virtual machines without input from the entity.

17. The computer-implemented method of claim 16, wherein the management action comprises at least one of the following: creating a new private virtual machine, deleting an existing private virtual machine, moving an existing private virtual machine and updating a private virtual machine.

18. The computer-implemented method of claim 17, wherein the management action is presented to the one of the one or more users via a user interface, and wherein the management action presented to the user via the user interface comprise management actions that are available for a specified set of the private virtual machines of the private domain.

19. A computer program product comprising one or more hardware storage media having stored thereon computer-executable instructions which, when executed by one or more hardware processors, cause the one or more hardware processors to perform a computer-implemented method for provisioning private virtual machines in a public cloud in manner to permit domain-joined remote applications, the computer-implemented method comprising:
at a public cloud computing system receiving from a private domain of an entity authentication information indicating one or more private virtual machines at the private domain which are to be provisioned on the public cloud computing system;
establishing a virtual network at the public cloud computing system, the virtual network being configured to host the one or more private virtual machines of the entity and which are not publically accessible, each virtual machine being configured to host one or more remote applications;
using the authentication information, establishing an authenticated connection between the virtual network and the private domain of the entity;
provisioning, at a virtual machine managing module at the public cloud computing system, one or more of the private virtual machines of the private domain, at least some of the provisioned private virtual machines hosting one or more remote applications and the one or more remote applications requiring access to private data stored at the private domain that is publically inaccessible; and
one or more users accessing at the public cloud computing system the one or more provisioned private virtual machines and then accessing through the authenticated connection the private data required by the one or more remote applications hosted by the at least some of the provisioned private virtual machines.

20. The computer program product of claim 19, wherein the computer-implemented method further comprises:
receiving from one of the one or more users an indication that a management action is to be taken with respect to the one or more provisioned private virtual machines; and
the virtual machine managing module automatically performing the indicatedmanagement action to be taken with respect to the one or more provisioned private virtual machines without input from the entity.

21. The computer program product of claim 20, wherein the management action comprises at least one of the following: creating a new private virtual machine, deleting an existing private virtual machine, moving an existing private virtual machine and updating a private virtual machine.

* * * * *